(12) United States Patent
Fukuhara et al.

(10) Patent No.: US 8,721,921 B2
(45) Date of Patent: *May 13, 2014

(54) LIQUID CRYSTAL POLYESTER COMPOSITION

(75) Inventors: Yoshiyuki Fukuhara, Tsukuba (JP); Shintaro Komatsu, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 13/280,744

(22) Filed: Oct. 25, 2011

(65) Prior Publication Data

US 2012/0104315 A1     May 3, 2012

(30) Foreign Application Priority Data

Oct. 29, 2010 (JP) ................ P2010-243458

(51) Int. Cl.
*C09K 19/52*  (2006.01)
*C09K 19/06*  (2006.01)
*C09K 19/00*  (2006.01)
*H01R 12/00*  (2006.01)
*H05K 1/00*  (2006.01)
*C08K 3/34*  (2006.01)
*C08K 3/22*  (2006.01)

(52) U.S. Cl.
USPC ............... 252/299.01; 252/299.6; 428/1.1; 439/67; 439/625; 524/449; 524/451

(58) Field of Classification Search
USPC ............ 252/299.01, 299.6; 428/1.1; 439/67, 439/625; 524/449, 451
See application file for complete search history.

(56) References Cited

U.S. PATENT DOCUMENTS

| | | | |
|---|---|---|---|
| 8,231,805 B2 * | 7/2012 | Fukuhara et al. | ........ 252/299.01 |
| 2003/0001139 A1 | 1/2003 | Nagano et al. | |
| 2007/0298733 A1 | 12/2007 | Cole et al. | |
| 2011/0086968 A1 | 4/2011 | Fukatsu et al. | |
| 2011/0114884 A1 | 5/2011 | Fukuhara et al. | |
| 2012/0025421 A1 * | 2/2012 | Fukuhara et al. | ............. 264/300 |
| 2012/0217678 A1 * | 8/2012 | Komatsu et al. | ........... 264/328.1 |

FOREIGN PATENT DOCUMENTS

| | | |
|---|---|---|
| JP | 2002-294038 A | 10/2002 |
| JP | 2010-003661 A | 1/2010 |
| WO | 2008023839 A1 | 2/2008 |

* cited by examiner

*Primary Examiner* — Geraldina Visconti
(74) *Attorney, Agent, or Firm* — Panitch Schwarze Belisario & Nadel LLP

(57) ABSTRACT

To provide a liquid crystal polyester composition that yields compacts that are resistant to cracking. A plate-like filler with a volume-average particle size of 14 μm or greater and a fibrous filler are combined with a liquid crystal polyester to form a liquid crystal polyester composition. The total content of the plate-like filler and the fibrous filler is 45-55 wt % with respect to the total of the liquid crystal polyester composition. The weight ratio of the fibrous filler content to the plate-like filler content is greater than 0.5 and not greater than 0.65.

5 Claims, No Drawings

US 8,721,921 B2

LIQUID CRYSTAL POLYESTER COMPOSITION

BACKGROUND OF THE INVENTION

1. Field of the Invention

The present invention relates to a liquid crystal polyester composition comprising a liquid crystal polyester, a plate-like filler and a fibrous filler.

2. Related Background Art

Liquid crystal polyesters have excellent melt flow properties and high heat resistance, strength and rigidity, and are therefore suitably used as injection molding materials for production of electrical and electronic components. However, because liquid crystal polyesters tend to have their molecular chains oriented in the direction of flow during molding, this results in anisotropy of the shrinkage and expansion coefficients and the mechanical properties of compacts, tending to result in problems of warping and cracking (weld cracking). Mixture of plate-like fillers and fibrous fillers to liquid crystal polyesters has been investigated with the aim of avoiding these problems. For example, Japanese Unexamined Patent Application Publication No. 2002-294038 describes a liquid crystal polyester composition comprising 10-100 parts by weight of a plate-like inorganic filler with a mean particle size of 5-20 μm and 10-100 parts by weight of a fibrous inorganic filler, with respect to 100 parts by weight of the liquid crystal polyester, and the weight ratio of the content of the fibrous filler to the content of the plate-like filler is greater than 0 and less than 0.5, or greater than 1.6 and less than 10. Also, International Patent Publication No. WO2008/023839 describes a liquid crystal polyester composition comprising 30-40 wt % of a plate-like filler with a mean particle size of 0.5-200 μm and 10-20 wt % of a fibrous filler, with respect to the total amount of the liquid crystal polyester composition, with a total content of 40-60 wt % for both. Also, Japanese Unexamined Patent Application Publication No. 2010-003661 describes a liquid crystal polyester composition comprising 25-35 wt % of a plate-like inorganic filler and 10-25 wt % of a fibrous filler, with respect to the total amount of the liquid crystal polyester composition, with a total content of 40-50 wt % for both.

SUMMARY OF THE INVENTION

The aforementioned conventional liquid crystal polyester compositions do not always have sufficiently reduced anisotropy during molding, and therefore when molding is carried out into compacts with thin sections or compacts with complex shapes, these have been prone to cracking under heat or pressure. For example, when molding is carried out into a connector such as a CPU socket, cracking can easily occurs by reflow mounting and pin insertion It is therefore an object of the invention to provide a liquid crystal polyester composition comprising a liquid crystal polyester, a plate-like filler and a fibrous filler, and yielding a compact that is resistant to cracking.

In order to achieve the aforestated object, the invention provides a liquid crystal polyester composition comprising a liquid crystal polyester, a plate-like filler with a volume-average particle size of 14 μm or greater, and a fibrous filler, wherein the total content of the plate-like filler and the fibrous filler is 45-55 wt % with respect to the total liquid crystal polyester composition, and the weight ratio (B/A) of the fibrous filler content (B) to the plate-like filler content (A) is greater than 0.5 and not greater than 0.65. According to the invention there is further provided a connector comprising the molded liquid crystal polyester composition.

By using a liquid crystal polyester composition of the invention it is possible to obtain compacts that are resistant to cracking.

DESCRIPTION OF THE PREFERRED EMBODIMENTS

A liquid crystal polyester is a liquid crystal polyester exhibiting liquid crystallinity in a molten state, and it preferably melts at a temperature of no higher than 450° C. The liquid crystal polyester may be a liquid crystal polyester amide, a liquid crystal polyester ether, a liquid crystal polyester carbonate or a liquid crystal polyester imide. The liquid crystal polyester is preferably a total aromatic liquid crystal polyester employing only aromatic compounds as the starting monomers.

Typical examples of liquid crystal polyesters include those obtained by polymerization (polycondensation) of an aromatic hydroxycarboxylic acid, an aromatic dicarboxylic acid and at least one compound selected from the group consisting of aromatic diols, aromatic hydroxyamines and aromatic diamines, those obtained by polymerization of a plurality of different aromatic hydroxycarboxylic acids, those obtained by polymerization of an aromatic dicarboxylic acid and at least one compound selected from the group consisting of aromatic diols, aromatic hydroxyamines and aromatic diamines, and those obtained by polymerization of a polyester such as polyethylene terephthalate and an aromatic hydroxycarboxylic acid. Here, hydroxycarboxylic acids, aromatic dicarboxylic acids, aromatic diols, aromatic hydroxyamines and aromatic diamines may be entirely or partially replaced independently from each other with their derivatives that are polymerizable.

Examples of polymerizable derivatives of carboxyl group-containing compounds such as aromatic hydroxycarboxylic acids and aromatic dicarboxylic acids include those having a carboxyl group converted to an alkoxycarbonyl or aryloxycarbonyl group (esters), those having a carboxyl group converted to a haloformyl group (acid halides), and those having a carboxyl group converted to an acyloxycarbonyl group (acid anhydrides). Examples of polymerizable derivatives of hydroxyl group-containing compounds such as aromatic hydroxycarboxylic acids, aromatic diols and aromatic hydroxyamines include those having a hydroxyl group acylated to an acyloxyl group (acylated derivatives). Examples of polymerizable derivatives of amino group-containing compounds such as aromatic hydroxyamines and aromatic diamines include those having an amino group acylated to an acylamino group (acylated derivatives).

The liquid crystal polyester preferably has a repeating unit represented by the following formula (1) (hereunder also referred to as "repeating unit (1)", and more preferably it has repeating unit (1), a repeating unit represented by the following formula (2) (hereunder also referred to as "repeating unit (2)") and a repeating unit represented by the following formula (3) (hereunder also referred to as "repeating unit (3)").

—O—Ar¹—CO— (1)

—CO—Ar²—CO— (2)

—X—Ar³—Y— (3)

(Ar¹ represents phenylene, naphthylene or biphenylylene. Ar² and Ar³ each independently represent phenylene, naphthylene, biphenylylene or a group represented by the following formula (4). X and Y each independently represent an oxygen atom or an imino group (—NH—). The hydrogens of the groups represented by $Ar^1$, $Ar^2$ and $Ar^3$ may each independently be replaced by halogen atoms, alkyl groups or aryl groups.)

$$—Ar^4\text{-}Z\text{-}Ar^5— \quad (4)$$

($Ar^4$ and $Ar^5$ each independently represent phenylene or naphthylene. Z represents an oxygen atom, a sulfur atom or a carbonyl, sulfonyl or alkylidene group.)

Halogen atoms include fluorine, chlorine, bromine and iodine. Examples of alkyl groups include methyl, ethyl, n-propyl, isopropyl, n-butyl, isobutyl, s-butyl, t-butyl, n-hexyl, 2-ethylhexyl, n-octyl and n-decyl, preferably with 1-10 carbon atoms. Examples of aryl groups include phenyl, o-tolyl, m-tolyl, p-tolyl, 1-naphthyl and 2-naphthyl, preferably with 6-20 carbon atoms. When hydrogens of the groups represented by $Ar^1$, $Ar^2$ and $Ar^3$ are replaced with such groups, the number is preferably not greater than 2 and more preferably not greater than 1, independently for each group represented by $Ar^1$, $Ar^2$ or $Ar^3$.

Examples of alkylidene groups include methylene, ethylidene, isopropylidene, n-butylidene and 2-ethylhexylidene, preferably with 1-10 carbon atoms.

Repeating unit (1) is a repeating unit derived from a prescribed aromatic hydroxycarboxylic acid. Repeating unit (1) is preferably one in which $Ar^1$ is a p-phenylene group (a repeating unit derived from p-hydroxybenzoic acid) or $Ar^1$ is a 2,6-naphthylene group (a repeating unit derived from 6-hydroxy-2-naphthoic acid).

Repeating unit (2) is a repeating unit derived from a prescribed aromatic dicarboxylic acid. Repeating unit (2) is preferably one in which $Ar^2$ is a p-phenylene group (a repeating unit derived from terephthalic acid), $Ar^2$ is an m-phenylene group (a repeating unit derived from isophthalic acid), $Ar^2$ is a 2,6-naphthylene group (a repeating unit derived from 2,6-naphthalenedicarboxylic acid), or $Ar^2$ is a diphenylether-4,4'-diyl group (a repeating unit derived from diphenylether-4,4'-dicarboxylic acid), and more preferably it is one in which $Ar^2$ is a p-phenylene group (a repeating unit derived from terephthalic acid) or $Ar^2$ is an m-phenylene group (a repeating unit derived from isophthalic acid).

Repeating unit (3) is a repeating unit derived from a prescribed aromatic diol, aromatic hydroxylamine or aromatic diamine. Repeating unit (3) is preferably one in which $Ar^3$ is a p-phenylene group (a repeating unit derived from hydroquinone, p-aminophenol or p-phenylenediamine), or $Ar^3$ is a 4,4'-biphenylylene group (a repeating unit derived from 4,4'-dihydroxybiphenyl, 4-amino-4'-hydroxybiphenyl or 4,4'-diaminobiphenyl).

The content of repeating unit (1) is preferably 30 mol % or greater, more preferably 30-80 mol %, even more preferably 40-70 mol % and yet more preferably 45-65 mol %, with respect to the total amount of all of the repeating units (the total being obtained by dividing the mass of each repeating unit composing the liquid crystal polyester by the formula mass of each repeating unit to determine the substance equivalents (moles) of each repeating unit, and totaling them). The content of repeating unit (2) is preferably not greater than 35 mol %, more preferably 10-35 mol %, even more preferably 15-30 mol % and yet more preferably 17.5-27.5 mol %, with respect to the total amount of all of the repeating units. The content of repeating unit (3) is preferably not greater than 35 mol %, more preferably 10-35 mol %, even more preferably 15-30 mol % and yet more preferably 17.5-27.5 mol %, with respect to the total amount of all of the repeating units. A greater content of repeating unit (1) will tend to improve the melt flow property, heat resistance and strength/rigidity, but if it is too great the melting temperature and melt viscosity will tend to rise, requiring a higher temperature for molding.

The ratio of the content of repeating unit (2) and the content of repeating unit (3) represented by [repeating unit (2) content/repeating unit (3) content] (mol/mol) is preferably 0.9/1-1/0.9, more preferably 0.95/1-1/0.95 and even more preferably 0.98/1-1/0.98.

The liquid crystal polyester may have 2 or more of repeating units (1) to (3), each independently. The liquid crystal polyester may also have repeating units other than repeating units (1) to (3). Their content is preferably not greater than 10 mol % and more preferably not greater than 5 mol %, with respect to the total of all of the repeating units.

The liquid crystal polyester preferably has a repeating unit (3) in which X and Y are each oxygen atoms, or in other words, a repeating unit derived from a prescribed aromatic diol, as this will tend to lower the melt viscosity. The liquid crystal polyester is more preferably one with only a repeating unit (3) in which X and Y are each oxygen atoms.

The liquid crystal polyester is preferably produced by melt polymerization of starting monomers corresponding to the constituent repeating units, and solid-phase polymerization of the obtained polymer (prepolymer). This will allow highly manageable production of a high-molecular-weight liquid crystal polyester with high heat resistance, and strength/rigidity. The melt polymerization may be carried out in the presence of a catalyst. Examples of such catalysts include metal compounds such as magnesium acetate, stannous acetate, tetrabutyl titanate, lead acetate, sodium acetate, potassium acetate and antimony trioxide, and nitrogen-containing heterocyclic compounds such as 4-(dimethylamino) pyridine and 1-methylimidazole, with nitrogen-containing heterocyclic compounds being preferred for use.

The liquid crystal polyester has a flow start temperature of preferably 270° C. or higher, more preferably 270-400° C. and even more preferably 280-380° C. A higher flow start temperature will tend to improve the heat resistance and the strength/rigidity, but if it is too high the melting temperature and melt viscosity will tend to rise, requiring a higher temperature for molding.

The flow start temperature is also known as the flow temperature or flow point, and it is the temperature at which the viscosity is 4800 Pa·s (48,000 poise), when the liquid crystal polyester is melted while increasing the temperature at a rate of 4° C./min under a load of 9.8 MPa (100 kg/cm²) using a capillary rheometer, and extruded from a nozzle with an inner diameter of 1 mm and a length of 10 mm, being used as a measure of the molecular weight of the liquid crystal polyester ("Liquid Crystal Polymers—Synthesis, Molding and Applications", ed. by N. Koide, CMC Publishing Co., Ltd., Jun. 5, 1987, p. 95).

The liquid crystal polyester composition comprises a liquid crystal polyester, a plate-like filler with a volume-average particle size of 14 μm or greater, and a fibrous filler. The total content of the plate-like filler and the fibrous filler is 45-55 wt % with respect to the total amount of the liquid crystal polyester composition, and the weight ratio (B/A) of the fibrous filler content (B) to the plate-like filler content (A) is greater than 0.5 and not greater than 0.65. By thus adding a prescribed plate-like filler and fibrous filler to the liquid crystal polyester in a prescribed proportion, it is possible to obtain a liquid crystal polyester composition with sufficiently reduced anisotropy of shrinkage, expansion coefficient and mechanical properties, and yielding a compact that is resistant to cracking.

The plate-like filler used is preferably an inorganic filler. Examples of plate-like inorganic fillers include talc, mica, graphite, wollastonite, glass flakes, barium sulfate and calcium carbonate. Talc and mica are preferred among these, with talc being more preferred. Mica may be muscovite, bronze mica, fluorine bronze mica or tetrasilicon mica.

The volume-average particle size of the plate-like filler is 14 μm or greater as mentioned above, because if it is smaller the crack-preventing effect will be insufficient. The volume-average particle size of the plate-like filler is preferably 14.2 μm or greater. The volume-average particle size of the plate-like filler is also preferably not greater than 100 μm, more preferably not greater than 50 μm and even more preferably not greater than 30 μm. The volume-average particle size of the plate-like filler can be measured by a laser diffraction method.

The fibrous filler may be an inorganic filler or an organic filler. Examples of fibrous inorganic fillers include glass fibers; carbon fibers such as PAN carbon fibers and pitch carbon fibers; ceramic fibers such as silica fibers, alumina fibers and silica-alumina fibers; and metal fibers such as stainless steel fibers. Others include whiskers such as potassium titanate whiskers, barium titanate whiskers, wollastonite whiskers, aluminum borate whiskers, silicon nitride whiskers and silicon carbide whiskers. Examples of fibrous organic fillers include polyester fibers and aramid fibers. Glass fibers are preferred among these.

The number-average fiber size of the fibrous filler is preferably 5-20 μm, the number-average fiber length of the fibrous filler is preferably 100-500 μm, and the number-average aspect ratio (number-average fiber length/number-average fiber size) of the fibrous filler is preferably 10-100. The number-average fiber size and number-average fiber length of the fibrous filler can be measured by observation with an electron microscope.

The total content of the plate-like filler and the fibrous filler with respect to the total liquid crystal polyester composition is 45-55 wt % as mentioned above and if it is lower or higher than this value, the crack-preventing effect would be insufficient. The total content of the plate-like filler and the fibrous filler is preferably 50-55 wt %. Also, the weight ratio (B/A) of the fibrous filler content (B) to the plate-like filler content (A) is greater than 0.5 and not greater than 0.65, as mentioned above, and it is preferably greater than 0.5 and not greater than 0.6, and even more preferably 0.55-0.6.

The liquid crystal polyester composition may contain one or more other components such as a filler other than the plate-like filler and the fibrous filler, an additive, or a resin other than a liquid crystal polyester.

Examples of fillers other than plate-like fillers or fibrous fillers include spherical or other particulate fillers of silica, alumina, titanium oxide, glass beads, glass balloons, boron nitride, silicon carbide, calcium carbonate or the like. The content of these is preferably 0-10 wt % based on the total liquid crystal polyester composition.

Examples of additives include antioxidants, heat stabilizers, light stabilizers such as ultraviolet absorbers, antistatic agents, surfactants, flame retardants, pigments and dyes. The content of these is preferably 0-3 wt % based on the total liquid crystal polyester composition.

Examples of resins other than liquid crystal polyesters include thermoplastic resins other than liquid crystal polyesters, such as polypropylene, polyamides, polyesters other than liquid crystal polyesters, polysulfone, polyphenylene sulfide, polyether ketones, polycarbonates, polyphenylene ethers and polyetherimides; and thermosetting resins such as phenol resins, epoxy resins, polyimide resins and cyanate resins. Their content is preferably 0-10 parts by weight with respect to 100 parts by weight of the liquid crystal polyester.

The liquid crystal polyester composition is preferably prepared by melt kneading the liquid crystal polyester, plate-like filler, fibrous filler and other components used as necessary, using an extruder, and extruding the mixture into a pellet form. The extruder used preferably has a cylinder, one or more screws situated in the cylinder, and one or more supply ports provided in the cylinder, and more preferably it has one or more vents provided in the cylinder.

By molding a liquid crystal polyester composition obtained in this manner it is possible to obtain compacts that are resistant to cracking. The method of molding the liquid crystal polyester composition is preferably a melt molding method. Examples include injection molding, extrusion methods such as T-die methods or inflation methods, compression molding methods, blow molding methods, vacuum forming methods and press molding. Injection molding is preferred among these.

Examples of products and parts that are compacts obtained as described above include bobbins such as optical pickup bobbins and transformer coil bobbins; relay parts such as relay cases, relay bases, relay sprues and relay armatures; connectors such as RIMM, DDR, CPU sockets, S/O, DIMM, Board to Board connectors, FPC connectors and card connectors; reflectors such as lamp reflectors and LED reflectors; holders such as lamp holders and heater holders; diaphragms such as speaker diaphragms; separators such as copy machine paper delivery extractors and printer paper delivery extractors; camera module parts; switch parts; motor parts; sensor parts; hard disk drive parts; cooking utensils such as ovenware; vehicle parts; aircraft parts; and sealing members such as semiconductor element sealing members and coil sealing members.

In particular, the liquid crystal polyester composition according to a preferred embodiment has sufficiently reduced anisotropy of shrinkage, expansion coefficient and mechanical properties and is resistant to cracking, even when molded into a compact having a thin section or a compact having a complex shape, and it can be suitably used as a material for a connector such as a CPU socket, thus helping to prevent cracking caused by reflow mounting and pin insertion.

EXAMPLES

[Measurement of Flow Start Temperature of Liquid Crystal Polyester]

Using a flow tester ("Model CFT-500" by Shimadzu Corp.), approximately 2 g of liquid crystal polyester was packed into a cylinder equipped with a die having a nozzle with an inner diameter of 1 mm and a length of 10 mm, and the liquid crystal polyester was melted while raising the temperature at a rate of 4° C./min under a load of 9.8 MPa (100 kg/cm$^2$) and extruded from the nozzle, and the temperature at which a viscosity of 4800 Pa·s (48,000 poise) was exhibited was measured.

[Production of Liquid Crystal Polyester (1)]

After placing 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl and 1347.6 g (13.2 mol) of acetic anhydride in a reactor equipped with a stirrer, torque motor, nitrogen gas inlet tube, thermometer and reflux condenser, and substituting the reactor interior gas with nitrogen gas, 0.18 g of 1-methylimidazole was added and the temperature was raised from room temperature to 150° C. over a period of 30 minutes while stirring under a nitrogen gas stream, and the mixture was circulated at 150° C. for 30 minutes. Next, 2.4 g of 1-methylimidazole was added, the temperature was raised from 150° C. to 320° C. over a period of 2 hours and 50 minutes while distilling off the acetic acid by-product and unreacted acetic anhydride, and when an increase in torque was observed, the contents of the reactor were removed and the mixture was cooled to room temperature. The obtained solid was crushed with a pulverizer, the temperature was raised from room temperature to 250° C. over a period of 1 hour under a nitrogen atmosphere and then raised from 250° C. to 295° C. over a period of 5 hours and held at 295° C. for 3 hours, for solid-phase polymerization, after which it was cooled to obtain a powder-like liquid crystal polyester (1). The flow start temperature of the liquid crystal polyester (1) was 327° C.

[Production of Liquid Crystal Polyester (2)]

After placing 994.5 g (7.2 mol) of p-hydroxybenzoic acid, 239.2 g (1.44 mol) of terephthalic acid, 159.5 g (0.96 mol) of isophthalic acid, 446.9 g (2.4 mol) of 4,4'-dihydroxybiphenyl and 1347.6 g (13.2 mol) of acetic anhydride in a reactor equipped with a stirrer, torque motor, nitrogen gas inlet tube, thermometer and reflux condenser, and substituting the reactor interior gas with nitrogen gas, 0.18 g of 1-methylimidazole was added and the temperature was raised from room temperature to 150° C. over a period of 30 minutes while stirring under a nitrogen gas stream, and the mixture was circulated at 150° C. for 30 minutes. Next, 2.4 g of 1-methylimidazole was added, the temperature was raised from 150° C. to 320° C. over a period of 2 hours and 50 minutes while distilling off the acetic acid by-product and unreacted acetic anhydride, and when an increase in torque was observed, the contents of the reactor were removed and the mixture was cooled to room temperature. The obtained solid was crushed with a pulverizer, the temperature was raised from room temperature to 220° C. over a period of 1 hour under a nitrogen atmosphere and then raised from 220° C. to 240° C. over a period of 30 minutes and held at 240° C. for 10 hours, for solid-phase polymerization, after which it was cooled to obtain a powder-like liquid crystal polyester (2). The flow start temperature of the liquid crystal polyester (2) was 286° C.

[Plate-Like Filler]

The materials indicated below were used as the plate-like filler. The volume-average particle size is the value of D50 determined by measurement by laser diffraction under the following conditions.

(D50 Measuring Conditions)
Apparatus: Mastersizer 2000 (Malvern Instruments Ltd)
Soft: Mastersizer 2000 Version 4.00
Particle Refractive Index: 1.65-0.1 i
Dispersing Medium: water
Dispersing Medium Refractive Index: 1.33
Analysis Model: Generic mode
Scattering Intensity: 5-7%
Talc (1): "MS-KY" (volume-average particle size: 14.2 μm) by Nippon Talc Co., Ltd.
Talc (2): "X-50" (volume-average particle size: 13.2 μm) by Nippon Talc Co., Ltd.
Talc (3): "K-1B" (volume-average particle size: 6.5 μm) by Nippon Talc Co., Ltd.
Talc (4): "CROWN TALC PP" (volume-average particle size: 10.8 μm) by Matsuura Sangyo Co., Ltd.

Examples 1 and 2, Comparative Examples 1-4

[Preparation of Liquid Crystal Polyester Compositions]

After mixing 100 parts by weight of the liquid crystal polyester, a plate-like filler of the type and amount listed in Table 1 and glass fiber ("CS03 JAPX-1" by Owens Coming Manufacturing Ltd.) in the amount listed in Table 1, a twin-screw extruder ("PCM-30" by Ikegai Tekko, KK.) was used for granulation at a cylinder temperature of 340° C., to obtain a pelletized liquid crystal polyester composition.

[Evaluation of Crack Resistance]

The obtained liquid crystal polyester composition was molded into a CPU socket (a flat connector having a lattice structure on the inner side of the outer frame, an inner frame on the inner side of the lattice section, an opening on the inner side of the inner frame, outer frame dimensions of 42 mm×42 mm, an outer frame thickness of 4 mm, a lattice section thickness of 3 mm, an inner frame thickness of 4 mm, inner frame inner dimensions of 14 mm×14 mm, a lattice section pitch of 1 mm, and pin insertion hole dimensions of 0.7×0.7 mm) using an injection molding machine ("ROBOSHOT S-2000i 30B" by Fanuc Corporation) at a cylinder temperature of 350° C., a mold temperature of 70° C. and an injection speed of 200 mm/sec. The CPU socket was heat treated at 290° C. for 5 minutes using a hot air circulation oven (Espec Corp.), and the presence of cracking was confirmed by external observation. The results are shown in Table 1. In the table 1, "+" means "cracking was observed" and "−" means "cracking was not observed".

TABLE 1

|  |  |  | Example 1 | Example 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| Liquid | (1) | (wt %) | 25 | 27.5 | 30 | 30 | 22 | 27.5 | 27.5 | 27.5 |
| crystal | (2) | (wt %) | 20 | 22.5 | 25 | 25 | 18 | 22.5 | 22.5 | 22.5 |
| polyester |  |  |  |  |  |  |  |  |  |  |
| Talc | (1) | (wt %) | 35 | 32 | 30 | 22.5 | 37.5 | — | — | — |
|  | (2) | (wt %) | — | — | — | — | — | 32 | — | — |
|  | (3) | (wt %) | — | — | — | — | — | — | 32 | — |
|  | (4) | (wt %) | — | — | — | — | — | — | — | 32 |
| Glass fiber |  | (wt %) | 20 | 18 | 15 | 22.5 | 22.5 | 18 | 18 | 18 |
| Talc + glass fiber |  | (wt %) | 55 | 50 | 45 | 45 | 60 | 50 | 50 | 50 |
| Glass fiber/Talc |  | (wt. ratio) | 0.57 | 0.56 | 0.5 | 1 | 0.6 | 0.56 | 0.56 | 0.56 |
| Cracking |  |  | − | − | + | + | + | + | + | + |

What is claimed is:

1. A liquid crystal polyester composition comprising a liquid crystal polyester, a plate-like filler with a volume-average particle size of 14 μm or greater, and a fibrous filler, wherein the total content of the plate-like filler and the fibrous filler is 45-55 wt % with respect to the total liquid crystal polyester composition, and the weight ratio (B/A) of the fibrous filler content (B) to the plate-like filler content (A) is greater than 0.5 and not greater than 0.65.

2. A liquid crystal polyester composition according to claim 1, wherein the plate-like filler is talc.

3. A liquid crystal polyester composition according to claim 1, wherein the weight ratio (B/A) of the fibrous filler content (B) to the plate-like filler content (A) is 0.55-0.6.

4. A liquid crystal polyester composition according to claim 1, wherein the fibrous filler is a glass fiber.

5. A connector obtained by molding a liquid crystal polyester composition according to claim 1.

* * * * *